United States Patent
Lee

(10) Patent No.: US 10,866,889 B2
(45) Date of Patent: Dec. 15, 2020

(54) MEMORY SYSTEM PERFORMING A GARBAGE COLLECTION OPERATION AND A SUDDEN POWER-OFF RECOVERY OPERATION AND OPERATING METHOD THEREOF

(71) Applicant: SK hynix Inc., Gyeonggi-do (KR)

(72) Inventor: Jong-Min Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 163 days.

(21) Appl. No.: 16/109,070

(22) Filed: Aug. 22, 2018

(65) Prior Publication Data

US 2019/0236005 A1    Aug. 1, 2019

(30) Foreign Application Priority Data

Jan. 30, 2018 (KR) ........................ 10-2018-0011373

(51) Int. Cl.
| | |
|---|---|
| *G06F 12/02* | (2006.01) |
| *G06F 3/06* | (2006.01) |
| *G06F 11/14* | (2006.01) |
| *G06F 11/10* | (2006.01) |

(52) U.S. Cl.
CPC .......... *G06F 12/0253* (2013.01); *G06F 3/064* (2013.01); *G06F 3/0608* (2013.01); *G06F 3/0689* (2013.01); *G06F 11/108* (2013.01); *G06F 11/1068* (2013.01); *G06F 11/1441* (2013.01); *G06F 2212/262* (2013.01); *G06F 2212/7201* (2013.01); *G06F 2212/7205* (2013.01); *G06F 2212/7208* (2013.01)

(58) Field of Classification Search
CPC combination set(s) only.
See application file for complete search history.

(56) References Cited

U.S. PATENT DOCUMENTS

| | | | |
|---|---|---|---|
| 2013/0173850 A1* | 7/2013 | Song | G06F 12/0246 |
| | | | 711/103 |
| 2016/0210066 A1* | 7/2016 | Yamaura | G06F 3/0619 |
| 2017/0337972 A1* | 11/2017 | Lee | G11C 16/16 |
| 2018/0081552 A1* | 3/2018 | Lee | G06F 11/1451 |
| 2018/0307496 A1* | 10/2018 | Ke | G06F 11/2268 |
| 2018/0336104 A1* | 11/2018 | Koo | G06F 11/1417 |
| 2018/0341557 A1* | 11/2018 | Koo | G06F 12/0253 |
| 2018/0374552 A1* | 12/2018 | Hong | G11C 11/5628 |

(Continued)

FOREIGN PATENT DOCUMENTS

| | | |
|---|---|---|
| KR | 1020160031099 | 3/2016 |
| KR | 1020160075229 | 6/2016 |
| KR | 1020160110596 | 9/2016 |

*Primary Examiner* — Amine Riad
(74) *Attorney, Agent, or Firm* — IP & T Group LLP

(57) ABSTRACT

A memory system includes a memory device, and a controller suitable for selecting at least one common operation necessary to be performed in first and second tasks, selecting the first or second task, and selectively performing one or more of a valid data scan operation, a valid data read operation, a valid data write operation, and a valid data map update operation based on selected information, wherein the first task is a garbage collection operation performed on a host data block, a system data block and a map data block, wherein the second task is a recovery operation performed after a sudden power-off (SPO) that occurs during the valid data map update operation.

16 Claims, 11 Drawing Sheets

(56) References Cited

U.S. PATENT DOCUMENTS

| | | | |
|---|---|---|---|
| 2019/0079830 A1* | 3/2019 | Kim | G06F 3/0679 |
| 2019/0196743 A1* | 6/2019 | Hsieh | G06F 3/0644 |
| 2019/0196960 A1* | 6/2019 | Lin | G06F 11/07 |
| 2019/0213079 A1* | 7/2019 | Kim | G06F 11/1441 |
| 2019/0220392 A1* | 7/2019 | Lin | G11O 5/143 |
| 2019/0227926 A1* | 7/2019 | Ke | G06F 3/0604 |
| 2019/0310936 A1* | 10/2019 | Novogran | G06F 12/0246 |
| 2020/0065029 A1* | 2/2020 | Kim | G06F 11/1068 |

\* cited by examiner

MEMORY SYSTEM PERFORMING A GARBAGE COLLECTION OPERATION AND A SUDDEN POWER-OFF RECOVERY OPERATION AND OPERATING METHOD THEREOF

CROSS-REFERENCE TO RELATED APPLICATION(S)

The present application claims priority under 35 U.S.C. § 119(a) to Korean Patent Application No. 10-2018-0011373, filed on Jan. 30, 2018, the disclosure of which is incorporated herein by reference in its entirety.

BACKGROUND

1. Field

Various embodiments of the present invention relate to a memory system. Particularly, the embodiments relate to a memory system capable of controlling a garbage collection operation and a sudden power-off recovery operation, and an operating method of the memory system.

2. Description of the Related Art

The computer environment paradigm has shifted to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption since they have no moving parts, as compared with a hard disk device. Examples of memory systems having such advantages include universal serial bus (USB) memory devices, memory cards having various interfaces, and solid state drives (SSD).

SUMMARY

Various embodiments of the present invention are directed to a memory system that may manage operations required in common in a garbage collection operation and a sudden power-off recovery operation in a single module, and an operating method of the memory system.

In accordance with an embodiment of the present invention, a memory system includes: a memory device; and a controller suitable for selecting at least one common operation necessary to be performed in first and second tasks, selecting the first or second task, and selectively performing one of more of a valid data scan operation, a valid data read operation, a valid data write operation and a valid data map update operation based on selected information, wherein the first task is a garbage collection operation performed on a host data block, a system data block and a map data block, wherein the second task is a recovery operation performed after a sudden power-off (SPO) that occurs during the valid data map update operation.

In accordance with an embodiment of the present invention, an operating method of a memory system includes: checking whether a selected task is a first task or a second task; selecting one of more common operations necessary to be performed in the first and second tasks; and selectively performing one or more of a valid data scan operation, a valid data read operation, a valid data write operation and a valid data map update operation based on selected information, wherein the first task is a garbage collection operation performed on a host data block, a system data block and a map data block, wherein the second task is a recovery operation performed after a sudden power-off (SPO) that occurs during the valid data map update operation.

In accordance with an embodiment of the present invention, a memory system includes: a memory device including a plurality of cells; and a controller suitable for recognizing and selecting at least one process commonly performed on the memory device for both a garbage collection operation and a sudden power-off (SPO) recovery operation, and sharing performance of the at least one process between the garbage collection operation and the sudden power-off recovery operation, wherein the at least one process includes at least one of a valid data scan operation, a valid data read operation, a valid data write operation, and a valid data map update operation.

DETAILED DESCRIPTION

Figure 1:
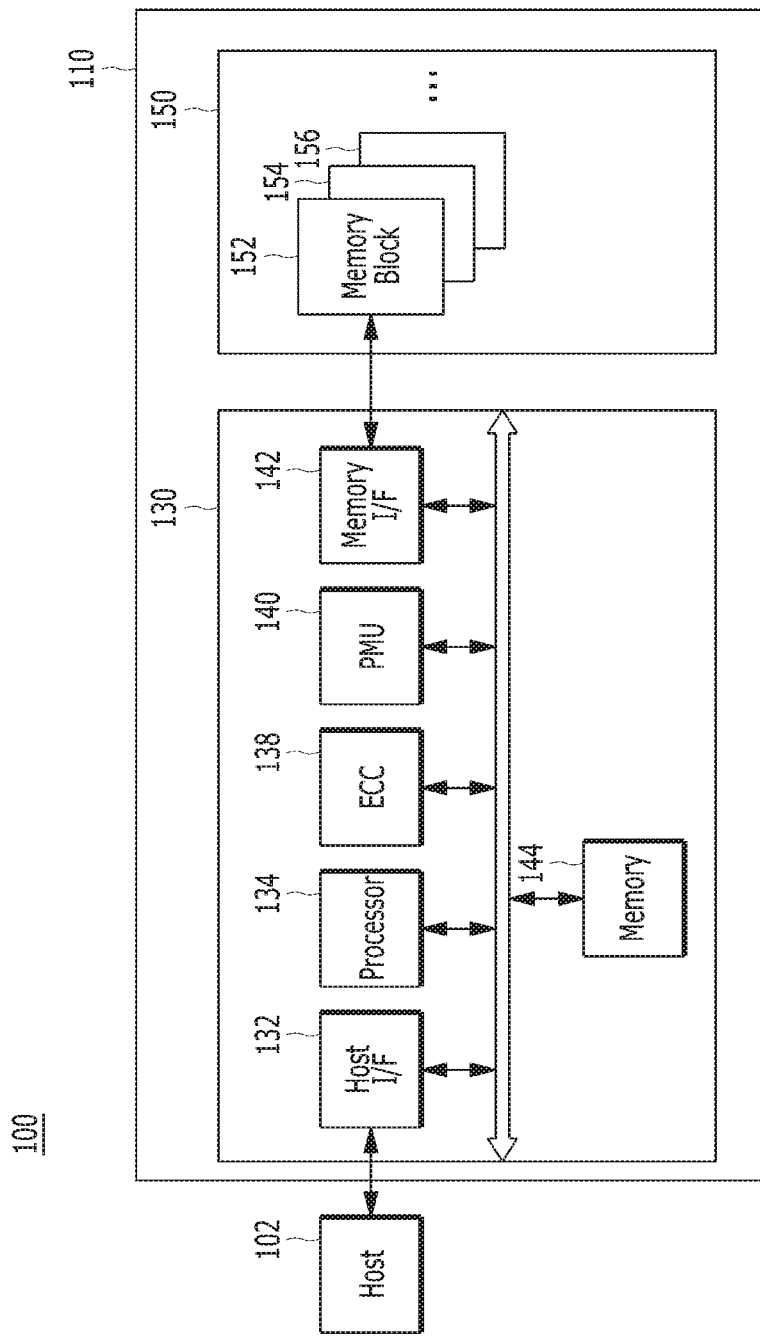
FIG. 1 is a block diagram illustrating a data processing system including a memory system in accordance with an embodiment of the present invention.

Various embodiments of the present invention are described below in more detail with reference to the accompanying drawings. However, the present invention may be embodied in other forms and in variations of any of the described embodiments, and thus is not limited to the embodiments set forth herein. Rather, the described embodiments are provided so that this disclosure is thorough and complete and fully conveys the present invention to those skilled in the art to which this invention pertains. Throughout the disclosure, like reference numerals refer to like parts throughout the various figures and embodiments of the present invention. Moreover, throughout the specification, reference to "an embodiment" or the like is not necessarily to only one embodiment, and different references to "an embodiment" or the like are not necessarily to the same embodiment(s).

It will be understood that, although the terms "first", "second", "third", and the like may be used herein to identify various elements, these elements are not limited by these terms. These terms are used to distinguish one element from another element that otherwise have the same or similar names. Thus, a first element described below could also be termed as a second or third element without departing from the spirit and scope of the present invention.

The drawings are not necessarily to scale and, in some instances, proportions may have been exaggerated to clearly illustrate features of the embodiments. When an element is referred to as being connected or coupled to another element, it should be understood that the former can be directly connected or coupled to the latter, or electrically connected or coupled to the latter via one or more intervening elements.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for describing particular embodiments and is not intended to limit the present invention.

As used herein, singular forms are intended to include the plural forms and vice versa, unless the context clearly indicates otherwise.

It will be further understood that the terms "comprises," "comprising," "includes," and "including" when used in this specification, specify the presence of the stated elements but do not preclude the presence or addition of one or more other elements. As used herein, the term "and/or" includes any and all combinations of one or more of the listed items.

Unless otherwise defined, all terms including technical and scientific terms used herein have the same meaning as commonly understood by one of ordinary skill in the art to which the present invention pertains in view of the present disclosure. It will be further understood that terms, such as those defined in commonly used dictionaries, should be interpreted as having a meaning that is consistent with their meaning in the context of the present disclosure and the relevant art and not be interpreted in an idealized or overly formal sense unless expressly so defined herein.

In the following description, numerous specific details are set forth to provide a thorough understanding of the present invention. The present invention may be practiced without some or all of these specific details. In other instances, well-known process structures and/or processes have not been described in detail to not unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 including a memory system 110 in accordance with an embodiment of the present invention.

Referring to FIG. 1, the data processing system 100 may include a host 102 operatively coupled to the memory system 110.

The host 102 may include any of a variety of portable electronic devices such as a mobile phone, a MP3 player and a laptop computer, or any of a variety of non-portable electronic devices such as a desktop computer, a game machine, a TV and a projector.

The host 102 may include at least one OS (operating system), which may manage and control overall functions and operations of the host 102. The OS may support an operation between the host 102 and a user using the data processing system 100 or the memory system 110. The OS may support functions and operations requested by a user. For example, the OS may be divided into a general OS and a mobile OS, depending on the mobility of the host 102. The general OS may be divided into a personal OS and an enterprise OS, depending on the environment of a user. For example, the personal OS configured to support a function of providing a service to general users may include Windows and Chrome, and the enterprise OS configured to secure and support high performance may include Windows server, Linux and Unix. Furthermore, the mobile OS may be configured to support a function of providing a mobile service to users, and a power saving function of a system may include Android, iOS and Windows Mobile. The host 102 may include a plurality of operating systems. The host 102 may execute an OS to perform an operation corresponding to a user's request on the memory system 110. Here, the host 102 may provide a plurality of commands corresponding to a user's request to the memory system 110. Thus, the memory system 110 may perform certain operations corresponding to the plurality of commands, that is, corresponding to the user's request.

The memory system 110 may store data for the host 102 in response to a request of the host 102. Non-limiting examples of the memory system 110 include a solid state drive (SSD), a multi-media card (MMC), a secure digital (SD) card, a universal storage bus (USB) device, a universal flash storage (UFS) device, a compact flash (CF) card, a smart media card (SMC), a personal computer memory card international association (PCMCIA) card and a memory stick. The MMC may include an embedded MMC (eMMC), a reduced size MMC (RS-MMC) and micro-MMC. The SD card may include a mini-SD card and micro-SD card.

The memory system 110 may include various types of storage devices. Non-limiting examples of such storage devices include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM), and a flash memory.

The memory system 110 may include a memory device 150 and a controller 130. The memory device 150 may store data for the host 102, and the controller 130 may control data storage into the memory device 150.

The controller 130 and the memory device 150 may be integrated into a single semiconductor device, which may be included in any of the various types of memory systems as described above. For example, the controller 130 and the memory device 150 may be integrated as a single semiconductor device to constitute an SSD. When the memory system 110 is used as an SSD, the operating speed of the host 102 connected to the memory system 110 can be improved. In another example, the controller 130 and the memory device 150 may be integrated as a single semiconductor device to constitute a memory card such as a PCMCIA (personal computer memory card international association) card, a CF card, a SMC (smart media card), memory stick, a MMC including a RS-MMC and a micro-MMC, SD card including a mini-SD, a micro-SD and a SDHC, or an UFS device.

Non-limiting application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device which may retain stored data even though power is not supplied. The memory device 150 may store data provided from the host 102 through a write operation, and output data stored therein to the host 102 through a read operation. In an embodiment, the memory device 150 may include a plurality of memory dies (not shown), and each memory die may include a plurality of planes (not shown). Each plane may include a plurality of memory blocks 152 to 156, each of which may include a plurality of pages, each of which may include a plurality of memory cells coupled to a word line. In an embodiment, the memory device 150 may be a flash memory having a 3-dimensional (3D) stack structure.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

More specifically, the controller 130 may include a host interface (I/F) 132, a processor 134, an error correction code (ECC) unit 138, a Power Management Unit (PMU) 140, a memory interface 142, and a memory 144, all operatively coupled or engaged via an internal bus.

The host interface 132 may process a command and data of the host 102. The host interface 132 may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and integrated drive electronics (IDE). The host interface 132 may be driven via a firmware, that is, a host interface layer (HIL) for exchanging data with the host 102.

Further, the ECC unit 138 may correct error bits of data to be processed by the memory device 150 and may include an ECC encoder and an ECC decoder. The ECC encoder may perform an error correction encoding on data to be programmed into the memory device 150 to generate data to which a parity bit is added. The data including the parity bit may be stored in the memory device 150. The ECC decoder may detect and correct an error contained in the data read from the memory device 150. In other words, the ECC unit 138 may perform an error correction decoding process to the data read from the memory device 150 through an ECC code used during an ECC encoding process. According to a result of the error correction decoding process, the ECC unit 138 may output a signal, for example, an error correction success or fail signal. When the number of error bits is more than a threshold value of correctable error bits, the ECC unit 138 may not correct the error bits, and instead may output the error correction fail signal.

The ECC unit 138 may perform error correction through a coded modulation such as a Low Density Parity Check (LDPC) code, a Bose-Chaudhri-Hocquenghem (BCH) code, a turbo code, a Reed-Solomon code, a convolution code, a Recursive Systematic Code (RSC), a Trellis-Coded Modulation (TCM) and a Block coded modulation (BCM). However, the ECC unit 138 is not limited to these error correction techniques. As such, the ECC unit 138 may include any and all circuits, modules, systems or devices for performing suitable error correction.

The PMU 140 may manage electrical power used and provided in the controller 130.

The memory interface 142 may serve as a memory/storage interface between the controller 130 and the memory device 150 such that the controller 130 may control the memory device 150 in response to a request from the host 102. When the memory device 150 is a flash memory, specifically a NAND flash memory, the memory interface 142 may be a NAND flash controller (NFC) and may generate a control signal for the memory device 150 and may provide data to the memory device 150 under the control of the processor 134. The memory interface 142 may work as an interface (e.g., a NAND flash interface) for processing a command and data between the controller 130 and the memory device 150. Specifically, the memory interface 142 may support data transfer between the controller 130 and the memory device 150. The memory interface 142 may use firmware, that is, a flash interface layer (FIL), for exchanging data with the memory device 150.

The memory 144 may serve as a working memory of the memory system 110 and the controller 130, and store data for driving the memory system 110 and the controller 130. The controller 130 may control the memory device 150 to perform read, program, and erase operations in response to a request from the host 102. The controller 130 may provide data read from the memory device 150 to the host 102, and may store data provided from the host 102 into the memory device 150. The memory 144 may store data required for the controller 130 and the memory device 150 to perform these operations.

The memory 144 may be a volatile memory. For example, the memory 144 may be a static random access memory (SRAM) or dynamic random access memory (DRAM). The memory 144 may be disposed within or external to the controller 130. FIG. 1 shows the memory 144 disposed within the controller 130. In an embodiment, the memory 144 may be an external volatile memory having a memory interface for transferring data between the memory 144 and the controller 130.

As described above, the memory 144 may include a program memory, a data memory, a write buffer/cache, a read buffer/cache, a data buffer/cache and a map buffer/cache to store some data required to perform data write and read operations between the host 102 and the memory device 150 and other data required for the controller 130 and the memory device 150 to perform these operations.

The processor 134 may control overall operations of the memory system 110. The processor 134 may use firmware to control the overall operations of the memory system 110. The firmware may be referred to as flash translation layer (FTL).

For example, the controller 130 may perform an operation requested by the host 102 in the memory device 150 through the processor 134, which is implemented as a microprocessor, a CPU, or the like. In other words, the controller 130 may perform a command operation corresponding to a command received from the host 102. Such command operation may be a foreground operation performed by the controller 130 in response to the command received from the host 102. For example, the foreground operation may include a program operation corresponding to a write command, a read operation corresponding to a read command, an erase operation corresponding to an erase command, and a parameter set operation corresponding to a set parameter command, or a set feature command as a set command.

Also, the controller 130 may perform a background operation on the memory device 150 through the processor 134, which may be realized as a microprocessor or a CPU. The background operation performed on the memory device 150 may include an operation of copying and processing data stored in some memory blocks among the memory blocks 152 to 156 of the memory device 150 into other memory blocks, e.g., a garbage collection (GC) operation, an operation of performing swapping between the memory blocks 152 to 156 or between the data of the memory blocks 152 to 156, e.g., a wear-leveling (WL) operation, an operation of storing the map data stored in the controller 130 in the memory blocks 152 to 156, e.g., a map flush operation, or an operation of managing bad blocks of the memory device 150, e.g., a bad block management operation of detecting and processing bad blocks among the memory blocks 152 to 156 in the memory device 150.

Also, in the memory system 110 in accordance with an embodiment of the present invention, the controller 130 may perform a plurality of command executions corresponding to a plurality of commands received from the host 102. For example, the controller 130 may perform in the memory device 150 a plurality of program operations corresponding to a plurality of write commands, a plurality of read operations corresponding to a plurality of read commands, and/or a plurality of erase operations corresponding to a plurality of erase commands. Also, the controller 130 may update metadata, (particularly, map data) according to the command executions.

The processor 134 of the controller 130 may include a management unit (not illustrated) for performing a bad management operation of the memory device 150. The management unit may perform a bad block management operation of checking a bad block, in which a program fail occurs due to the characteristic of a NAND flash memory during a program operation, among the plurality of memory blocks 152 to 156. The management unit may write the program-failed data of the bad block to a new memory block. In the memory device 150 having a 3D stack structure, the bad block management operation may reduce the use efficiency of the memory device 150 and the reliability of the memory system 110. Thus, a bad block management operation able to maintain system reliability is needed. The memory device of the memory system in accordance with an embodiment of the present invention is described in detail with reference to FIGS. 2 to 3.

Figure 2:
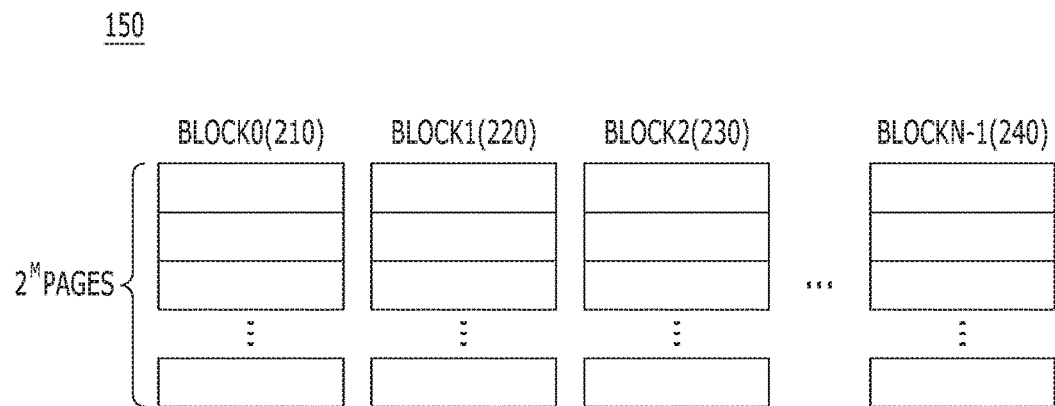
FIG. 2 is a schematic diagram illustrating an exemplary configuration of a memory device employed in the memory system shown in FIG. 1.
Figure 3:
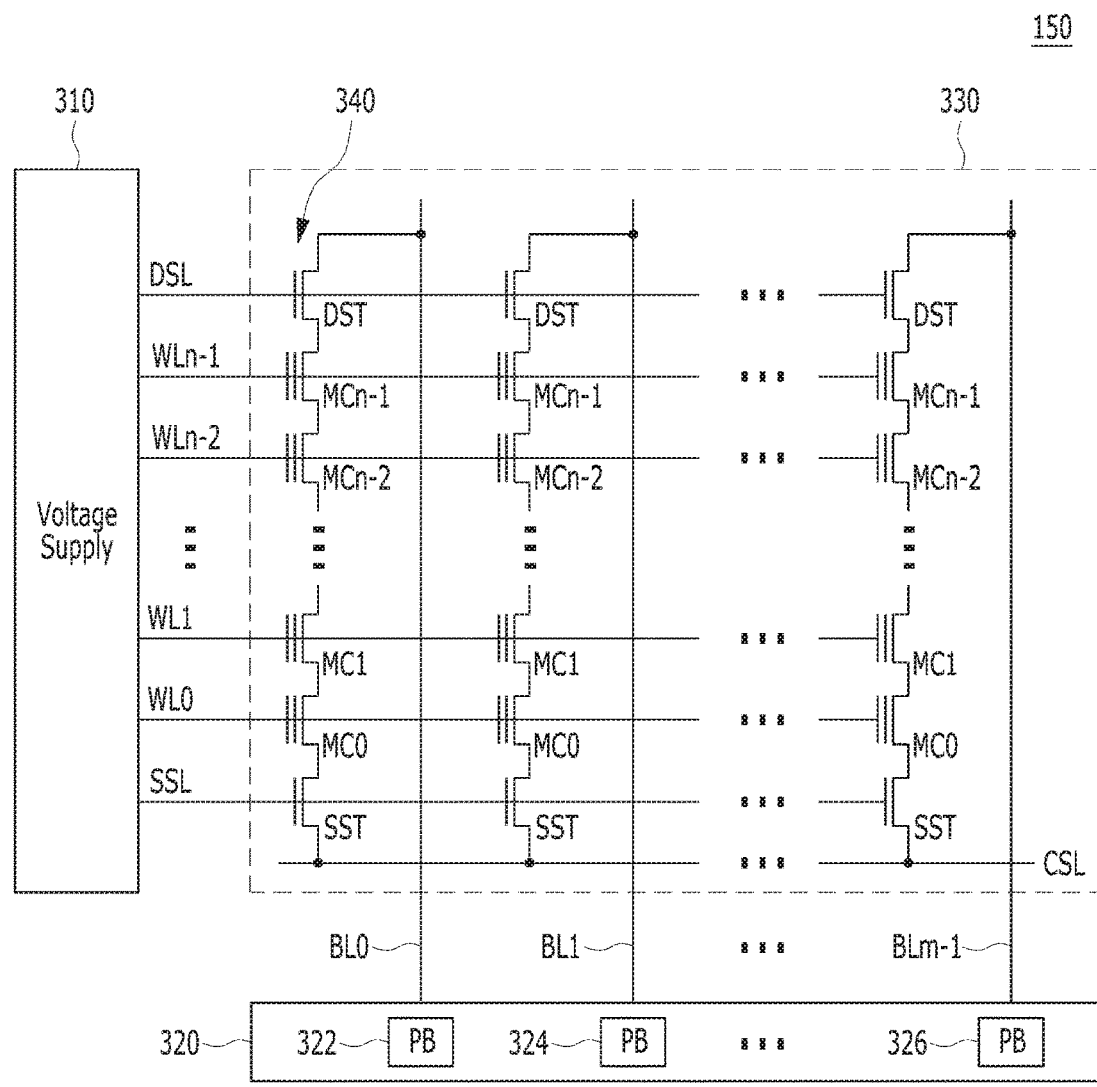
FIG. 3 is a circuit diagram illustrating an exemplary configuration of a memory cell array of a memory block in the memory device shown in FIG. 1.

FIG. 2 is a schematic diagram illustrating the memory device 150. FIG. 3 is a circuit diagram illustrating an exemplary configuration of a memory cell array of a memory block 330 in the memory device 150.

Referring to FIG. 2, the memory device 150 may include a plurality of memory blocks BLOCK0 to BLOCKN-1, where N is an integer greater than 1. Each of the blocks BLOCK0 to BLOCKN-1 may include a plurality of pages, for example, $2^M$ or M pages, the number of which may vary according to circuit design, M being an integer greater than 1. Each of the pages may include a plurality of memory cells that are coupled to a plurality of word lines WL.

Also, memory cells in the respective memory blocks BLOCK0 to BLOCKN-1 may be one or more of a single level cell (SLC) memory block storing 1-bit data or a multi-level cell (MLC) memory block storing 2-bit data. Hence, the memory device 150 may include SLC memory blocks or MLC memory blocks, depending on the number of bits which can be expressed or stored in each of the memory cells in the memory blocks. The SLC memory blocks may include a plurality of pages which are embodied by memory cells, each storing one-bit data. The SLC memory blocks may generally have higher data computing performance and higher durability than the MCL memory blocks. The MLC memory blocks may include a plurality of pages which are embodied by memory cells each storing multi-bit data (for example, 2 or more bits). The MLC memory blocks may generally have larger data storage space, that is, higher integration density, than the SLC memory blocks. In another embodiment, the memory device 150 may include a plurality of triple level cell (TLC) memory blocks. In yet another embodiment, the memory device 150 may include a plurality of quadruple level cell (QLC) memory blocks. The TCL memory blocks may include a plurality of pages which are embodied by memory cells each capable of storing 3-bit data. The QLC memory blocks may include a plurality of pages which are embodied by memory cells each capable of storing 4-bit data.

Instead of a nonvolatile memory, the memory device 150 may implemented by any one of a phase change random access memory (PCRAM), a resistive random access memory (RRAM (ReRAM)), a ferroelectrics random access memory (FRAM), and a spin transfer torque magnetic random access memory (STT-RAM (STT-MRAM)).

The memory blocks 210, 220, 230, 240 may store the data transferred from the host 102 through a program operation, and may transfer data stored therein to the host 102 through a read operation.

Referring to FIG. 3, the memory block 330 may include a plurality of cell strings 340 coupled to a plurality of corresponding bit lines BL0 to BLm-1. The cell string 340 of each column may Include one or more drain select transistors DST and one or more source select transistors SST. Between the drain and source select transistors DST and SST, a plurality of memory cells MC0 to MCn-1 may be coupled in series. In an embodiment, each of the memory cell transistors MC0 to MCn-1 may be embodied by an MLC capable of storing data information of a plurality of bits. Each of the cell strings 340 may be electrically coupled to a corresponding bit line among the plurality of bit lines BL0 to BLm-1. For example, as illustrated in FIG. 3, the first cell string is coupled to the first bit line BL0, and the last cell string is coupled to the last bit line BLm-1.

Although FIG. 3 illustrates NAND flash memory cells, the present disclosure is not limited thereto. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply 310 which generates different word line voltages including a program voltage, a read voltage, and a pass voltage to supply to the word lines according to an operation mode. The voltage generation operation of the voltage supply 310 may be controlled by a control circuit (not illustrated). Under the control of the control circuit, the voltage supply 310 may select at least one of the memory blocks (or sectors) of the memory cell array, select at least one of the word lines of the selected memory block, and provide the word line voltages to the selected word line(s) and the unselected word lines as may be needed.

The memory device 150 may include a read/write circuit 320 which is controlled by the control circuit. During a verification/normal read operation, the read/write circuit 320 may operate as a sense amplifier for reading (sensing and amplifying) data from the memory cell array. During a program operation, the read/write circuit 320 may operate as a write driver for supplying a voltage or a current to bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs). Each of the page buffers 322 to 326 may include a plurality of latches (not illustrated).

A read disturbance phenomenon refers to a phenomenon in which a read operation is performed on a plurality of pages in a specific block and level(s) of nearby cell(s) of another page in the block increases. When the read disturbance phenomenon is accumulated, error correction capability of the ECC unit 138 may be exceeded. When a read count is equal to or higher than a threshold value, a read reclaim operation refers to an operation of storing valid pages stored in a victim block in a target block and performing an erase operation on remaining pages included in the victim block in order to avoid an unrecoverable error.

The read reclaim operation is a background operation performed in the memory device 150 under control of the controller 130 without a command from the host. When this background operation is performed over a set or predetermined time, overhead may occur in a foreground operation performed based on the command from the host. Thus, the controller 130 usually does not perform the read reclaim operation on a large number of victim blocks at a time. Rather, the controller 130 usually performs the read reclaim operation on a relatively small set or predetermined number of memory blocks at a set or predetermined time interval. The time interval in which the read reclaim operation is performed may be determined according to extent of damage in the memory blocks (e.g., risk or a possibility of data loss). The read reclaim operation may be performed on victim blocks which are accumulated at the set or predetermined time interval. Consequently, occurrence of an unrecoverable error may be prevented or minimized.

In a conventional memory system, when amounts of data, which are read according to a read command from the host, are equal to or greater than a set or predetermined threshold value, the read reclaim operation is performed on a detected read reclaim target block, that is, a victim block.

If the read reclaim operation is performed in this way, performance of the read reclaim operation may not reflect the actual extent of damage of a memory block.

If a read operation is frequently performed on data of a specific memory block, a read count of that memory block increases, which in turn increases the frequency at which the read disturbance phenomenon occurs, resulting in occurrence of an unrecoverable error. Therefore, a memory block having a read count equal to or higher than a threshold value may have a higher probability of occurrence of an unrecoverable error, that is, a higher extent of damage relative to other memory blocks having read counts lower than the threshold value. The extent of damage of the memory block is generally proportional to the read count of the memory block. Even though the amounts of data read in response to the read commands from the host are substantially same, the read count may vary as a result of being measured differently using different methods or types of the command. That is, even though the amounts of data are equal, the extent of damage of the memory block may vary depending on how the read count is measured or the types of the command.

Specifically, the extent of damage of the memory block depends on the processing or handling of the command from the host. For example, even though the amounts of data read according to the command are equal, the read count measured when data in a single memory block are sequentially accessed and outputted may be higher than when data in several blocks are arbitrarily accessed and outputted. Therefore, if it is determined whether or not the read reclaim operation is performed based only the amounts of data read according to the command, the read reclaim operation may be performed too frequently given the extent to which the memory block is actually damaged. In addition, when the random read operation is performed, the memory block may be rapidly damaged and the unrecoverable error may occur before the amounts of data read according to the command of the host reach the threshold value, that is, before the read reclaim operation is performed on the victim block.

The extent of damage of the memory block depends on the methods of measuring the read count. The read count measured in units of individual memory blocks may be different from the read count measured in units of super blocks although the amounts of data read according to the command of the host are equal to each other. That is, even though the amounts of data are equal to each other, the extent of damage of the memory block may be determined differently depending on the methods of measuring the read count. Accordingly, it is difficult to correctly determine the extent to which the memory block is actually damaged based only on the amounts of data read according to the command of the host.

According to an embodiment of the present invention, the read reclaim operation may be performed based on an actual read count of a memory block rather than the amounts of data read according to the command from the host, considering the extent of damage of the memory block.

A flash memory, unlike a hard disk, has characteristics of writing and reading data in units of pages, erasing the data in units of blocks, and not supporting an overwrite operation. Due to such characteristics, in order to correct data recorded on a page, corrected data is written to a new page and the page of the original data is invalidated.

A garbage collection operation refers to an operation of periodically converting invalidated pages into empty pages in order to avoid flash memory space from being wasted due to the invalidated pages. The garbage collection operation includes an operation of selecting a victim block from all memory blocks in the memory device and copying valid pages of the victim block in empty pages of a target block. After all the valid pages are copied in the target block, all pages of the victim block may be placed in an empty state. Accordingly, memory space may be recovered through the garbage collection operation.

The victim block may be selected from various kinds of memory blocks such as a block in which map data is stored, a block in which host data is stored, and a block in which system data is stored, among all memory blocks. Detailed operations of the garbage collection operation may vary depending on the types of memory blocks from which the victim block is selected. Generally, an operation of scanning valid data of a victim block, an operation of reading the valid data from the victim block, an operation of writing the read valid data to a target block, and an operation of updating map information of the written valid data are sequentially performed in the garbage collection operation.

A sudden power-off recovery operation refers to an operation of recovering data in which a program failure or an update failure occurs due to sudden power-off. For example, when the sudden power-off occurs while host data is being programmed in a host open block, valid data on which a program operation is not completed is scanned from a host block, the valid data is read from the host block, the valid data is programmed in the host block, and a map update operation is performed on the programmed valid data during the recovery operation.

In a conventional memory system, even when the operation of scanning the valid data, the operation of reading the valid data, the operation of writing the valid data and the map update operation are included in common in the garbage collection operation and the sudden power-off recovery operation, a controller performs the above-described operations separately.

Also, in a conventional memory system, the garbage collection operation is separately performed depending on kinds of a garbage collection target block. Specifically, a map data block, a host data block and a system data block may be selected as a garbage collection target block, and yet the garbage collection operation is not performed on a plurality of kinds of the blocks using a single module.

Since common operations for a plurality of tasks are not collectively managed, and the garbage collection operation is not performed in a single module for various kinds of the garbage collection target blocks, the conventional memory system has a problem that overhead and complexity of a system increase.

According to an embodiment of the present invention, the common operations for a plurality of tasks and the common operations for various kinds of garbage collection target blocks may be managed in a single module, whereby the system overhead may be reduced, and the tasks may be rapidly completed.

Figure 4:
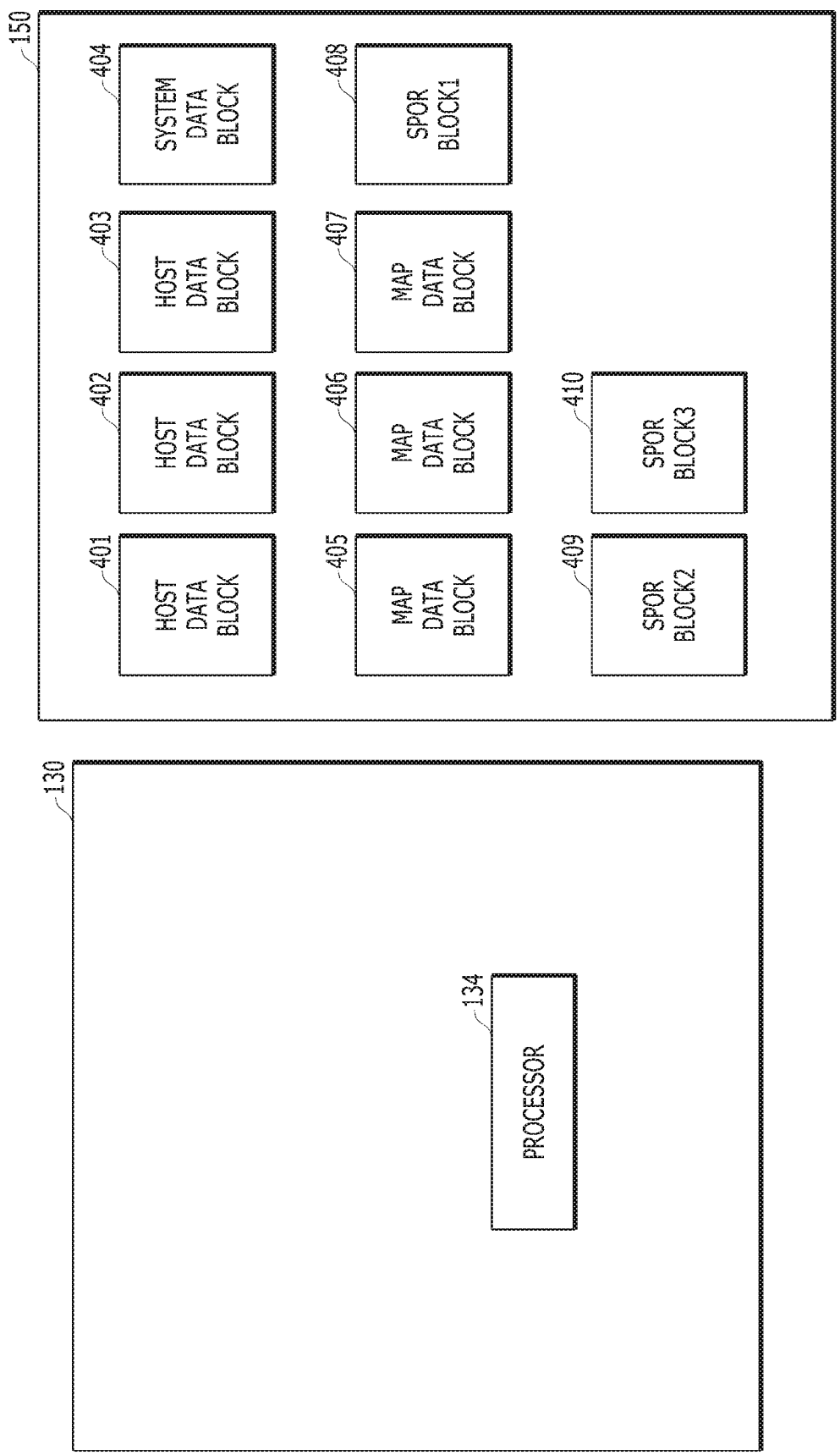
FIG. 4 is a block diagram illustrating a memory device and a controller of a memory system in accordance with an embodiment of the present invention.

FIG. 4 is a block diagram illustrating a memory device and a controller of a memory system 110 in accordance with an embodiment of the present invention.

FIG. 4 illustrates constituents of the memory system 110 related to aspects of the present invention.

As described above with reference to FIG. 1, the processor 134 may control the overall operations of the memory system 110. For example, the processor 134 may control the program and read operations included in the background operation performed on the memory device 150, and may perform the map update operation.

The processor 134 may determine whether a task to be performed corresponds to either a first task or a second task. The first task is performing the garbage collection operation, and the second task is performing the recovery operation due to sudden power-off occurring during the map update operation in a host open block.

The memory device 150 may include host data blocks 401, 402, 403, a system data block 404, map data blocks 405, 406, 407, and sudden power-off recover (SPOR) blocks 408, 409, 410. The host data blocks 401, 402, 403 may store host data, the system data block 404 may store system data, and the map data blocks 405, 406, 407 may store map data. The SPOR blocks 408, 409, 410 may include a plurality of host open blocks 408, 409, and a plurality of map data blocks 410.

When the task to be performed corresponds to the first task or the second task, the processor 134 may perform operations common to the first and second tasks according to kinds of the tasks as a single module. The processor 134 may sort out an operation which is unnecessary for either the first task or the second task from a plurality of operations performed in the module. When the task to be performed is the first task, the operation which is unnecessary to be performed may be sorted out from the plurality of operations performed in the module according to kinds of a garbage collection target block.

Specifically, the operations performed in common for the first and second tasks may include operations on valid data, such as an operation of reading the valid data, an operation of writing the valid data, and an operation of updating map information of the valid data.

When it is determined that the task to be performed is the first task, the processor 134 may determine whether the garbage collection target block corresponds to either the host data blocks 401, 402, 403, the system data block 404, or the map data blocks 405, 406, 407.

When the task to be performed is the first task, and the garbage collection target block corresponds to any one of the host data blocks 401, 402, 403 and the system data block 404, the processor 134 may determine a plurality of operations performed in common in the module as the operations which are necessary to be performed.

In accordance with an embodiment of the present invention, when the host data blocks 401, 402, 403 are selected as the garbage collection target block, the processor 134 may detect host data victim block 401 and host data target block 403. The host data victim block 401 may be a block having a number of invalid pages equal to or greater than a threshold value among the host data blocks 401, 402, 403, and the host data target block 403 may be a block having a number of free pages equal to or greater than a threshold value among the host data blocks 401, 402, 403. When the task to be performed is the first task, and the garbage collection target block is the host data blocks 401, 402, 403, the processor 134 may scan valid data stored in the host data victim block 401. The processor 134 may read the scanned valid data from the host data victim block 401 and write the read valid data to the host data target block 403. The processor 134 may update changed address information of the valid data and store the updated address information in the map data block 405 so that the valid data may be read from a changed address. Even when the system data block 404 is selected as the garbage collection target block, the processor 134 may perform the first task in the same manner as described above.

When the task to be performed is the first task and the garbage collection target block corresponds to the map data blocks 405, 406, 407, the processor 134 may determine that performance of the operation of updating the map information among the plurality of operations performed in common in the module is unnecessary.

In accordance with an embodiment of the present invention, when the map data blocks 405, 406, 407 are selected as the garbage collection target block, the processor 134 may determine that performance of the operation of updating the map information among the plurality of operations performed in common in the module is unnecessary, and detect the map data victim block 406 and the map data target block 407. The map data victim block 406 may be a block having a number of invalid pages equal to or greater than a threshold value among the map data blocks 405, 406, 407, and the map data target block 407 may be a block having a number of free pages equal to or greater than a threshold value among the map data blocks 405, 406, 407. When the task to be performed is the first task, and the garbage collection target block is the map data blocks 405, 406, 407, the processor 134 may scan valid data stored in the map data victim block 406. The processor 134 may read the scanned valid data from the map data victim block 406 and write the read valid data to the map data target block 407. The processor 134 may transmit a NULL signal for the map update operation to skip the map update operation.

When it is determined that the task to be performed is the second task, the processor 134 may determine that performance of the operation of writing valid data among the plurality of operations performed in common in the module is unnecessary. The second task may be an operation of performing a sudden power-off recovery operation on map information for data written to the host open block 409 after sudden power-off occurs while the map update operation is performed in the map data block 410. The processor 134 may transmit a NULL signal for a valid data write operation to skip the valid data write operation. The processor 134 may perform the map update operation in the map data block 410 again to update map data which is not changed due to occurrence of the sudden power-off.

Figure 5:
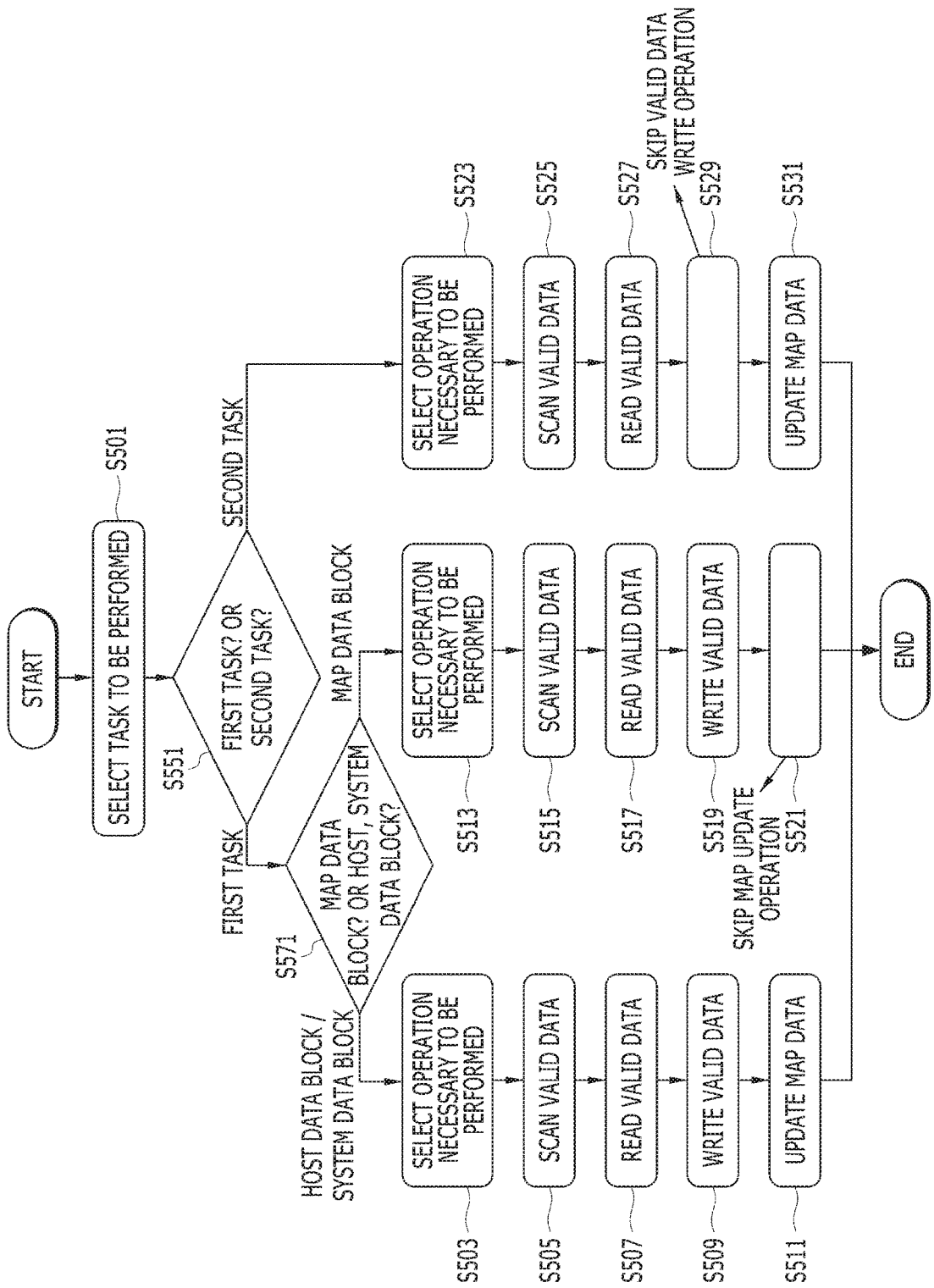
FIG. 5 is a flowchart illustrating a garbage collection operation and a sudden power-off recovery operation in accordance with an embodiment of the present invention.

FIG. 5 is a flowchart illustrating the garbage collection operation and the sudden power-off recovery operation in accordance with an embodiment of the present invention. The controller 130 may control the memory device 150 to perform the garbage collection operation and the sudden power-off recovery operation.

Referring to FIG. 5, the processor 134 may select the task to be performed in step S501.

In step S551, the processor 134 may determine whether the selected task corresponds to either the first task or the second task. Here, the first task is a task performing the garbage collection operation, and the second task is a task performing the recovery operation due to the sudden power-off occurring during the map update operation in the host open block.

In accordance with an embodiment of the present invention, the processor 134 may perform an operation of scanning valid data, an operation of reading the valid data, an operation of writing the valid data and an operation of updating map information of the valid data in a single module. Specifically, when the task to be performed is determined as the first task or the second task, the processor 134 may sort out an operation which is unnecessary to be performed in the first task or the second task from a plurality of operations performed in the module. The processor 134 may skip the sorted unnecessary operation and sequentially perform remaining operations.

When the task to be performed is determined as the first task in step S551, the processor 134 may determine whether the garbage collection target block corresponds to either the host data blocks 401, 402, 403, the system data block 404 or the map data blocks 405, 406, 407 in step S571.

The host data blocks 401, 402, 403 may store host data, the system data block 404 may store system data, and the map data blocks 405, 406, 407 may store map data.

When as a result of the determination in step S571, the garbage collection target block corresponds to any one of the host data blocks 401, 402, 403 and the system data block 404, the processor 134 may select an operation which is necessary to perform the garbage collection operation on the host data blocks 401, 402, 403 and the system data block 404 in step S503.

When the garbage collection operation is performed on the host data blocks 401, 402, 403 and the system data block 404, valid data of a victim block may be transmitted to a target block, and address information of the valid data may be changed. Accordingly, the processor 134 may update map data of the valid data to newly store the changed address information when an operation of writing the valid data to the target block is completed.

In step S503, when the task to be performed is the first task, and the garbage collection target block is any one of the host data blocks 401, 402, 403 and the system data block 404, the processor 134 may determine the operation of scanning the valid data, the operation of reading the valid data, the operation of writing the valid data and the operation of updating the map information of the valid data as the operations which are necessary to be performed in the module.

In step S505, the processor 134 may scan the valid data stored in a first victim block 401. The victim block may store host data or system data, and the processor 134 may detect a block having an invalid page count equal to or greater than a threshold value as the first victim block 401. The processor 134 may scan the valid data from the first victim block to store address information of the valid data.

When the operation of scanning the valid data is completed in step S505, the processor 134 may read the valid data from the first victim block 401 based on the address information of the valid data in step S507.

When the operation of reading the valid data from the first victim block 401 is completed in step S507, the processor 134 may write the read valid data to a first target block 403 in step S509. The processor 134 may select a block having a free page count equal to or greater than a threshold value as the first target block 403.

When the operation of writing the valid data to the first target block 403 is completed in step S509, the processor 134 may update the address information of the valid data in step S511. That is, the processor 134 may update the map data storing the address information of the valid data.

When as a result of the determination in step S571, the garbage collection target block corresponds to the map data blocks 405, 406, 407, the processor 134 may select an operation which is necessary to perform the garbage collection operation on the map data blocks 405, 406, 407 in step S513.

Address information of specific data is stored in map data. The map data may be updated when data corresponding to address information stored in the map data is stored in a specific page and address information of the data is varied.

Generally, when the garbage collection operation is performed on a specific block, valid data stored in the block may be stored in another block, and address information of the valid data may be varied. Accordingly, the processor 134 may perform the map update operation to store the varied address information of the valid data. However, when a target block of the garbage collection operation is a block storing the map data, the map update operation is not necessary to be performed separately.

Figure 6A:
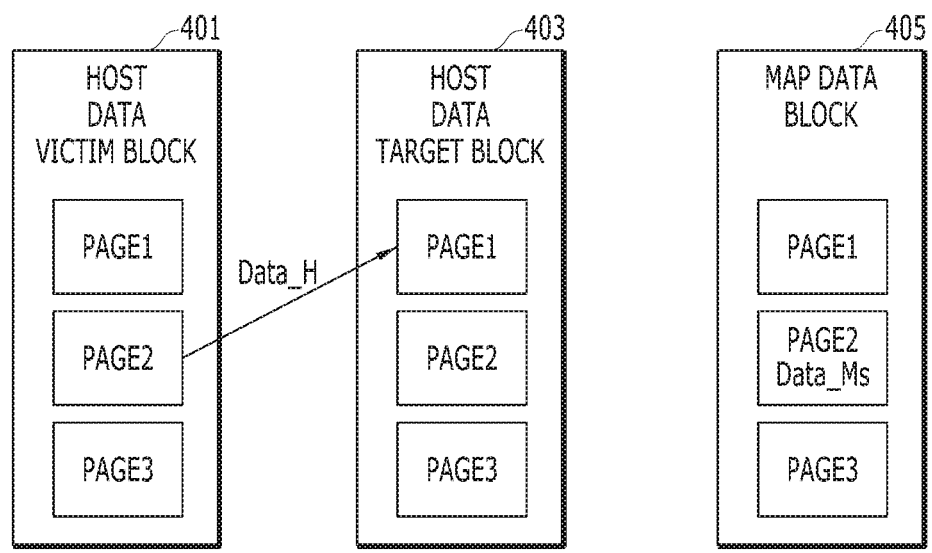
FIG. 6A is a diagram illustrating a case where a map update operation is necessary in a garbage collection operation.
Figure 6B:
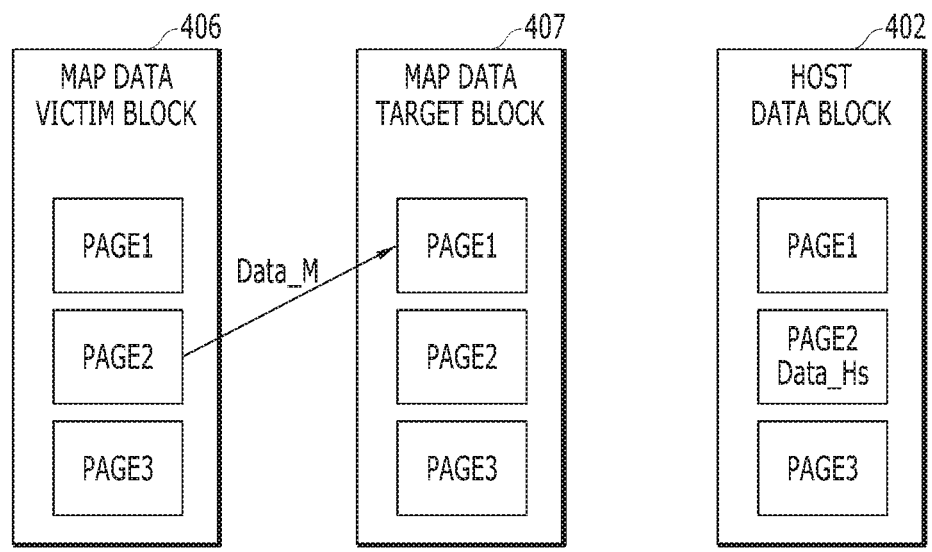
FIG. 6B is a diagram illustrating a case where a map update operation is unnecessary in a garbage collection operation.

FIG. 6A illustrates a general case where the map update operation is necessary in the garbage collection operation performed on a specific block. FIG. 6B illustrates a case where the map update operation is unnecessary when a target block of the garbage collection operation is the map data block.

Referring to FIG. 6A, the host data victim block 401 may include a plurality of pages, and the number of invalid pages among the plurality of pages may be equal to or greater than the threshold value. The host data target block 403 may include a plurality of pages, and the number of free pages among the plurality of pages may be equal to or greater than the threshold value. The map data block 405 may store map information of data stored in the host data victim block 401 and the host data target block 403. When the host data victim block 401 is selected as a first task performance target block, the processor 134 may scan valid data of the host data victim block 401. When it is checked that the valid data Data_H is stored in a second page PAGE2 of the host data victim block 401 as a result of the scan, the processor 134 may read the valid data Data_H from the second page PAGE2 of the host data victim block 401 and write the read data Data_H to a first page PAGE1 of the host data target block 403. The processor 134 may update map information of the data Data_H in the map data block 405 since an address in which the data Data_H is stored is changed from the second page PAGE2 of the host data victim block 401 to the first page PAGE1 of the host data target block 403.

Referring to FIG. 6B, the map data victim block 406 may include a plurality of pages, and the number of invalid pages among the plurality of pages may be equal to or greater than the threshold value. The map data target block 407 may include a plurality of pages, and the number of free pages among the plurality of pages may be equal to or greater than the threshold value. Data Data_M stored in a second page PAGE2 of the map data victim block 406 may store map information of data Data_Hs stored in a second page PAGE2 of the host data block 402. When the map data victim block 406 is selected as the first task performance target block, the processor 134 may determine a map information update operation as the operation which is unnecessary to be performed, and scan valid data in the map data victim block 406. When it is checked that the valid data Data_M is stored in the second page PAGE2 of the map data victim block 406 as a result of the scan, the processor 134 may read the valid data Data_M from the second page PAGE2 of the map data victim block 406 and write the read data Data_M to a first page PAGE1 of the map data target block 407. The processor 134 may transmit a NULL signal for the map update operation to skip the map update operation.

Specifically, in FIG. 6A, when the first task is performed, as the address of the data Data_H is changed from the second page PAGE2 of the host data victim block 401 to the first page PAGE1 of the host data target block 403, data Data_Ms of the map data block 405 storing the address information of the data Data_H may be changed as well. Accordingly, the processor 134 may update the data Data_Ms while performing the first task to change the data Data_Ms of the map data block 405.

In FIG. 6B, when the first task is performed, even though an address of the data Data_M is changed from the second page PAGE2 of the map data victim block 406 to the first page PAGE1 of the map data target block 407, an address of the data Data_Hs of the host data block 402 stored in the data Data_M may be maintained in the second page PAGE2 of the host data block 402. Accordingly, since address information of the data Data_Hs stored in the data Data_M is not changed although the garbage collection operation is performed on the data Data_M, the processor 134 may not need to perform the map update operation on the data Data_M.

Referring back to FIG. 5, in step S513, when the task to be performed is the first task, and the garbage collection target blocks are the map data blocks 405, 406, 407, the processor 134 may determine the operation of scanning the valid data, the operation of reading the valid data and the operation of writing the valid data as the operations which are necessary to be performed in the module.

In step S515, the processor 134 may scan the valid data stored in a second victim block 406. The second victim block 406 may store map data, and the processor 134 may detect a block having an invalid page count equal to or greater than a threshold value as the second victim block 406. The processor 134 may scan the valid data from the second victim block 406 to store address information of the valid data.

When the operation of scanning the valid data is completed in step S515, the processor 134 may read the valid data from the second victim block 406 based on the address information of the valid data in step S517.

When the operation of reading the valid data from the second victim block 406 is completed in step S517, the processor 134 may write the read valid data to a second target block 407 in step S519. The processor 134 may select a block having a free page count equal to or greater than a threshold value as the second target block 407.

When the operation of writing the valid data to the second target block 407 is completed in step S519, the processor 134 may skip the map update operation based on information where the task that performs currently corresponds to the first task and the second victim block 406 is selected from the map data blocks in step S521. For example, when the task to be performed is the first task, and the garbage collection target blocks and the map data blocks 405, 406, 407, the processor 134 may transmit a NULL signal for the map update operation and skip the map update operation.

When the task to be performed is determined as the second task in step S551, the processor 134 may select operations necessary for performing the second task among a plurality of operations performed in the module in step S523.

In step S523, when the task to be performed is the second task, the processor 134 may determine the operation of scanning the valid data, the operation of reading the valid data and the operation of updating map information of the valid data as the operations which are necessary to be performed in the second task.

In step S525, the processor 134 may scan the valid data stored in a host open block 409. The processor 134 may store address information of the valid data scanned from the host open block 409.

When the operation of scanning the valid data is completed in step S525, the processor 134 may read the valid data from the host open block 409 based on the address information of the valid data in step S527.

When the operation of reading the valid data is completed in step S527, the processor 134 may skip the operation of writing the valid data in step S529. For example, the processor 134 may transmit a NULL signal for the operation of writing the valid data and skip the operation of writing the valid data.

Figure 7:
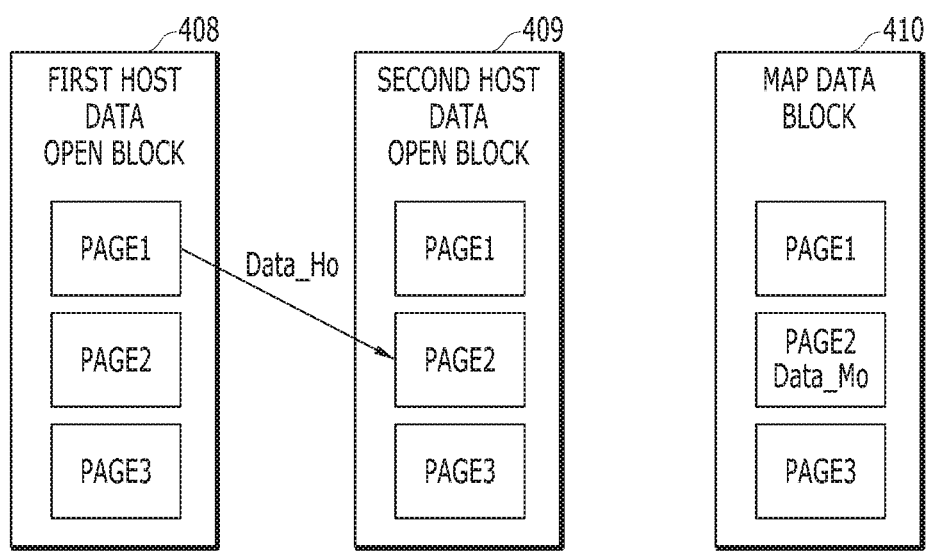
FIG. 7 is a diagram illustrating skipping a valid data write operation in a second task.

FIG. 7 illustrates skip of the valid data write operation in the second task.

Referring to FIG. 7, a sudden power-off recovery (SPOR) occurs while data Data_Mo of the map data block 410 storing address information of data Data_Ho is updated after the data Data_Ho is written from a first page PAGE1 of a first host data open block 408 to a second page PAGE2 of a second host data open block 409. Consequently, the data Data_Mo may not update an address of the data Data_Ho changed to the second page PAGE2 of the second host data open block 409. When power is supplied again to update an address of the data Data_Mo which is not updated due to the sudden power-off, namely, the address of the data Data_Ho, the processor 134 may scan the data Data_Ho. As a result of the scan, the processor 134 may check that the data Data_Ho is stored in the second page PAGE2 of the second host data open block 409. The processor 134 may read the data Data_Ho stored in the second page PAGE2 of the second host data open block 409 and update the data Data_Mo, which is the address information of the Data_Ho, from the second page PAGE2 of the first host data open block 408 to the second page PAGE2 of the second host data open block 409. Since the sudden power-off occurs after the data Data_Ho is written to the second host open block 409 which is a nonvolatile memory, an operation of additionally reading the data Data_Ho from the first page PAGE1 of the first host data open block 408 and writing the read data Data_Ho to the second page PAGE2 of the second host data open block 409 may not be necessary.

Referring back to FIG. 5, the processor 134 may update map information for the read valid data in step S531.

Figure 8:
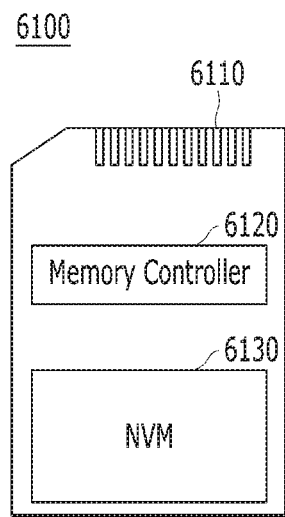
FIGS. 8 to 16 are diagrams schematically illustrating exemplary applications of the data processing system in accordance with various embodiments of the present invention.

FIG. 8 is a diagram schematically illustrating another example of the data processing system including the memory system in accordance with an embodiment. FIG. 8 schematically illustrates a memory card system to which the memory system may be applied.

Referring to FIG. 8, the memory card system 6100 may include a memory controller 6120, a memory device 6130 and a connector 6110.

More specifically, the memory controller 6120 may be electrically connected to, and configured to access, the memory device 6130 embodied by a nonvolatile memory. For example, the memory controller 6120 may be configured to control read, write, erase and background operations of the memory device 6130. The memory controller 6120 may be configured to provide an interface between the memory device 6130 and a host, and to use firmware for controlling the memory device 6130. That is, the memory controller 6120 may correspond to the controller 130 of the memory system 110 described with reference to FIG. 1, and the memory device 6130 may correspond to the memory device 150 of the memory system 110 described with reference to FIG. 1.

Thus, the memory controller 6120 may include a RAM, a processor, a host interface, a memory interface and an error correction component.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with the present embodiment may be applied to wired/wireless electronic devices or specific mobile electronic devices.

The memory device 6130 may be implemented by a nonvolatile memory. For example, the memory device 6130 may be implemented by any of various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM).

The memory controller 6120 and the memory device 6130 may be integrated into a single semiconductor device to form a solid-state driver (SSD). Also, the memory controller 6120 and the memory device 6130 may be so integrated to form a memory card such as a PC card (PCMCIA: Personal Computer Memory Card International Association), a compact flash (CF) card, a smart media card (e.g., a SM and a SMC), a memory stick, a multimedia card (e.g., a MMC, a RS-MMC, a MMCmicro and an eMMC), an SD card (e.g., a SD, a miniSD, a microSD and a SDHC), and/or a universal flash storage (UFS).

Figure 9:
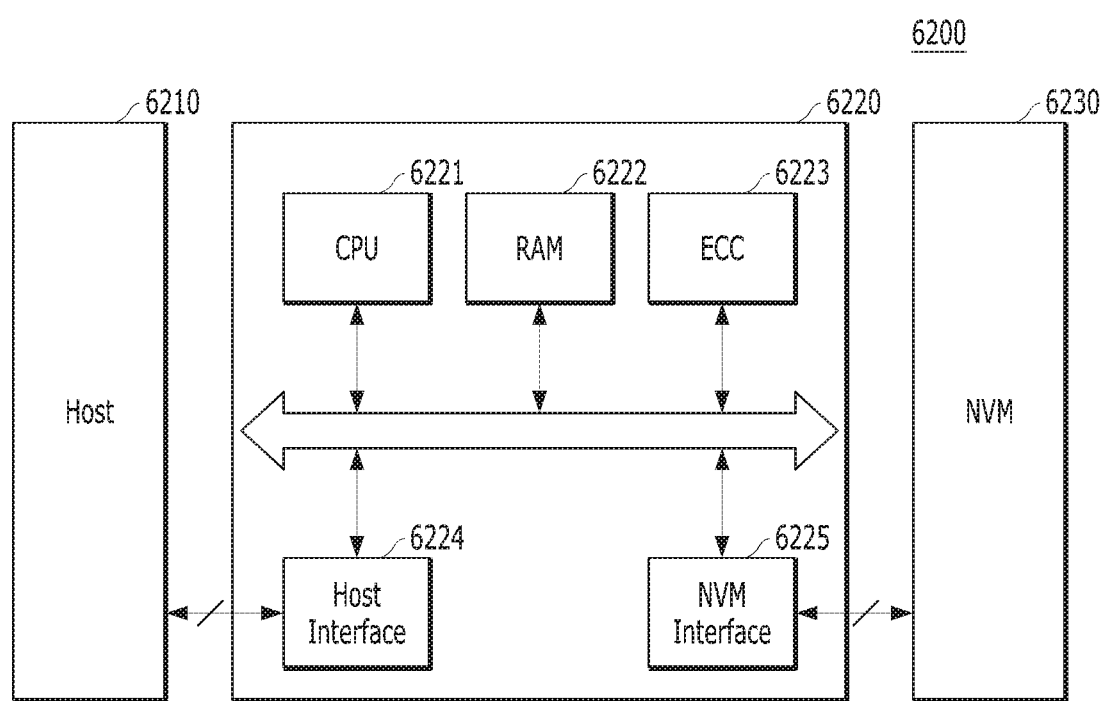

FIG. 9 is a diagram schematically illustrating another example of the data processing system including the memory system in accordance with an embodiment.

Referring to FIG. 9, the data processing system 6200 may include a memory device 6230 having one or more nonvolatile memories and a memory controller 6220 for controlling the memory device 6230. The data processing system 6200 illustrated in FIG. 9 may serve as a storage medium such as a memory card (CF, SD, micro-SD or the like) or USB device, as described with reference to FIG. 1. The memory device 6230 may correspond to the memory device 150 in the memory system 110 illustrated in FIG. 1, and the memory controller 6220 may correspond to the controller 130 in the memory system 110 illustrated in FIG. 1.

The memory controller 6220 may control a read, write or erase operation on the memory device 6230 in response to a request of the host 6210. The memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or vice versa. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an ECC (Error Correction Code) for correcting a failed bit or error bit of data provided from the memory device 6230.

The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224. The memory controller 6220 may transmit/receive data to/from the memory device 6230 through the NVM interface 6225. The host interface 6224 may be connected to the host 6210 through a PATA bus, a SATA bus, a SCSI, an USB, a PCIe or a NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. In particular, as the memory controller 6220 is configured to communicate with the external device according to one or more of various communication protocols, the memory system and the data processing system in accordance with an embodiment may be applied to wired/wireless electronic devices, particularly a mobile electronic device.

Figure 10:
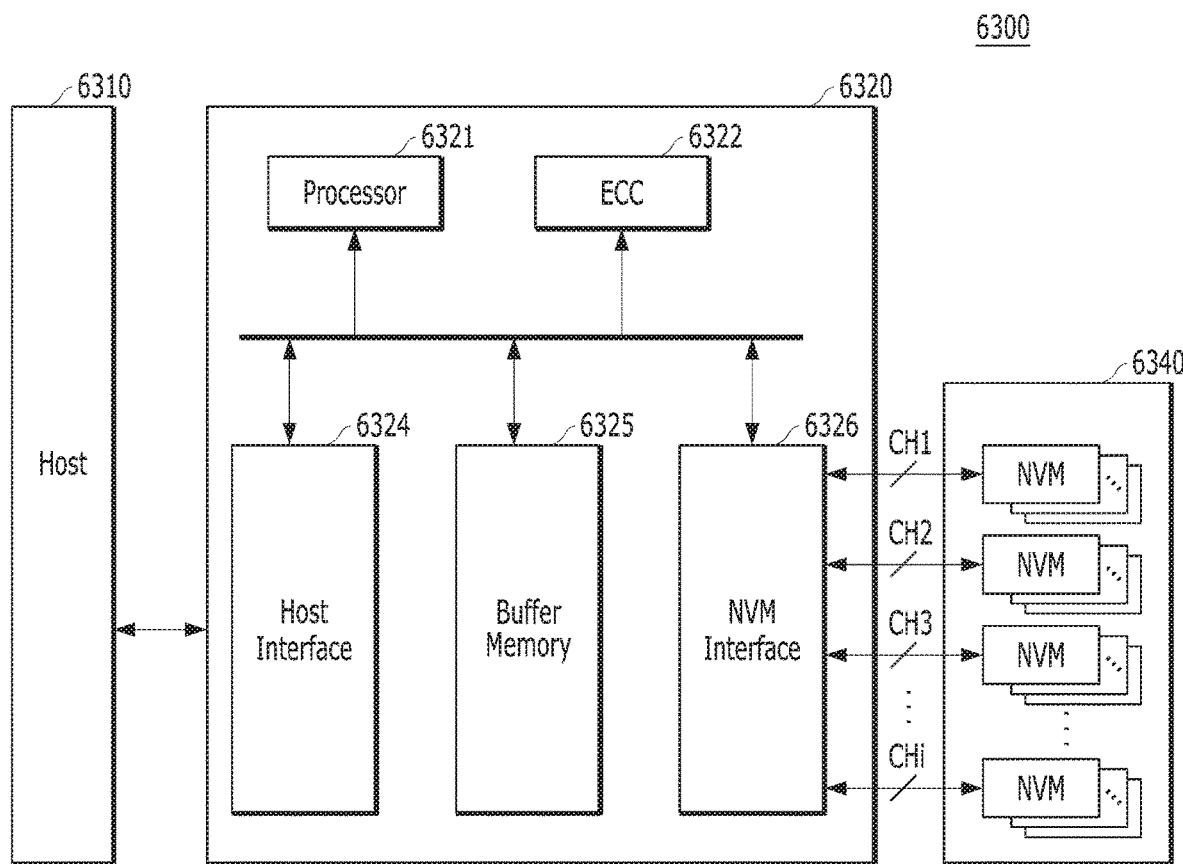

FIG. 10 is a diagram schematically illustrating another example of the data processing system including the memory system in accordance with an embodiment. FIG. 10 schematically illustrates an SSD to which the memory system may be applied.

Referring to FIG. 10, the SSD 6300 may include a controller 6320 and a memory device 6340 including a plurality of nonvolatile memories. The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340. Further, the buffer memory 6325 may temporarily store meta data of the plurality of flash memories NVM, for example, map data including a mapping table. The buffer memory 6325 may be embodied by any of a variety of volatile memories such as a DRAM, a SDRAM, a DDR SDRAM, a LPDDR SDRAM and a GRAM or nonvolatile memories such as a FRAM, a ReRAM, a STT-MRAM and a PRAM. FIG. 10 illustrates that the buffer memory 6325 is embodied in the controller 6320. However, the buffer memory 6325 may be external to the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 may be applied may be provided to embody a data processing system, for example, a RAID (Redundant Array of Independent Disks) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 11:
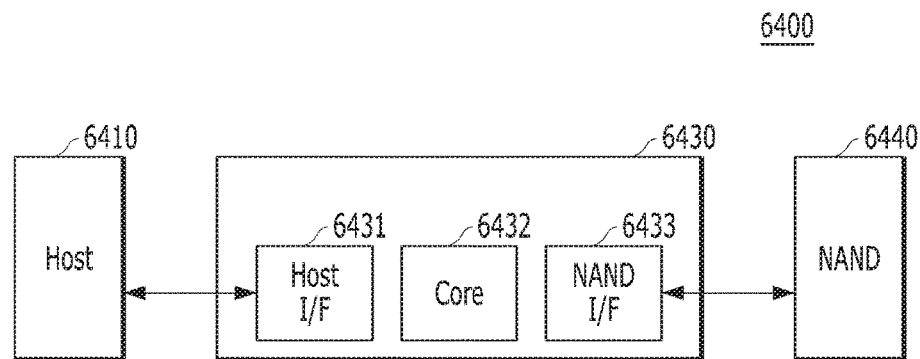

FIG. 11 is a diagram schematically illustrating another example of the data processing system including the memory system in accordance with an embodiment. FIG. 11 schematically illustrates an embedded Multi-Media Card (eMMC) to which the memory system may be applied.

Referring to FIG. 11, the eMMC 6400 may include a controller 6430 and a memory device 6440 embodied by one or more NAND flash memories. The controller 6430 may correspond to the controller 130 in the memory system 110 of FIG. 1. The memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 12 to 15 are diagrams schematically illustrating other examples of the data processing system including the memory system in accordance with embodiments. FIGS. 12 to 15 schematically illustrate UFS (Universal Flash Storage) systems to which the memory system may be applied.

Referring to FIGS. 12 to 15, the UFS systems 6500, 6600, 6700, 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices or particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700, 6800 may communicate with external devices, for example, wired/wireless electronic devices or particularly mobile electronic devices through UFS protocols, and the UFS devices 6520, 6620, 6720, 6820 and the UFS cards 6530, 6630, 6730, 6830 may be embodied by the memory system 110 illustrated in FIG. 1. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 8 to 10, and the UFS cards 6530, 6630, 6730, 6830 may be embodied in the form of the memory card system 6100 described with reference to FIG. 8.

Furthermore, in the UFS systems 6500, 6600, 6700, 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720, 6820 and the UFS cards 6530, 6630, 6730, 6830 may communicate with each other through any of various protocols other than the UFS protocol, for example, an UFDs, a MMC, a SD, a mini-SD, and a micro-SD.

Figure 12:
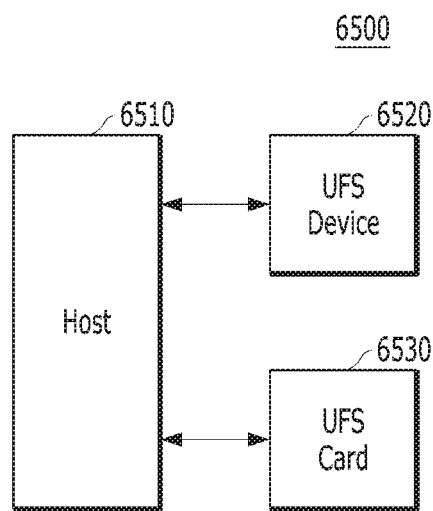

In the UFS system 6500 illustrated in FIG. 12, each of the host 6510, the UFS device 6520 and the UFS card 6530 may include UniPro. The host 6510 may perform a switching operation to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In the illustrated embodiment, one UFS device 6520 and one UFS card 6530 are connected to the host 6510. However, a plurality of UFS devices and UFS cards may be connected in parallel or in the form of a star to the host 6410. A star formation is an arrangement in which a single device is coupled with plural devices for centralized operation. A plurality of UFS cards may be connected in parallel or in the form of a star to the UFS device 6520 or connected in series or in the form of a chain to the UFS device 6520.

Figure 13:
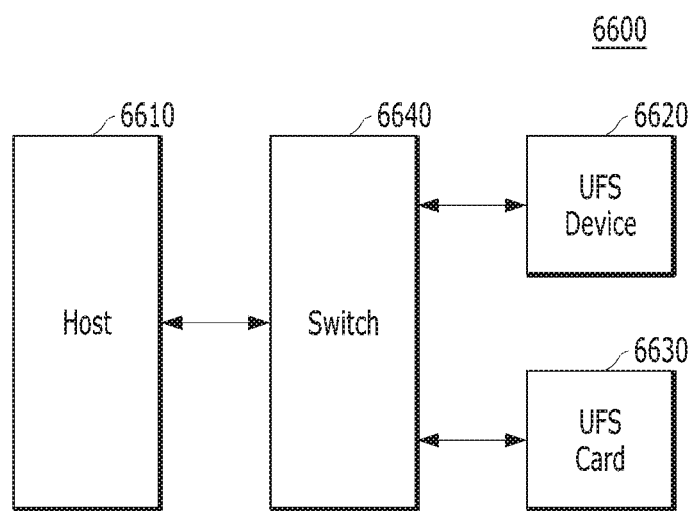

In the UFS system 6600 illustrated in FIG. 13, each of the host 6610, the UFS device 6620 and the UFS card 6630 may include UniPro. The host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the illustrated embodiment, one UFS device 6620 and one UFS card 6630 are connected to the switching module 6640. However, a plurality of UFS devices and UFS cards may be connected in parallel or in the form of a star to the switching module 6640. A plurality of UFS cards may be connected in series or in the form of a chain to the UFS device 6620.

Figure 14:
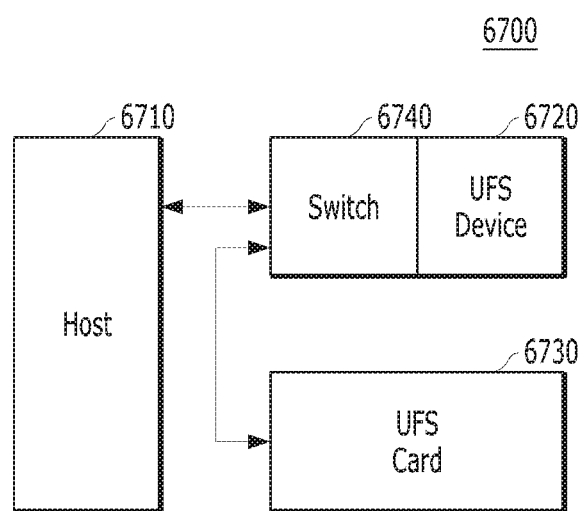

In the UFS system 6700 illustrated in FIG. 14, each of the host 6710, the UFS device 6720 and the UFS card 6730 may include UniPro. The host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro. The switching module 6740 may be integrated as one module with the UFS device 6720 inside or outside the UFS device 6720. In the illustrated embodiment, one UFS device 6720 and one UFS card 6730 are connected to the switching module 6740. However, a plurality of modules, each including the switching module 6740 and the UFS device 6720, may be connected in parallel or in the form of a star to the host 6710. In another example, a plurality of modules may be connected in series or in the form of a chain to each other. Furthermore, a plurality of UFS cards may be connected in parallel or in the form of a star to the UFS device 6720.

Figure 15:
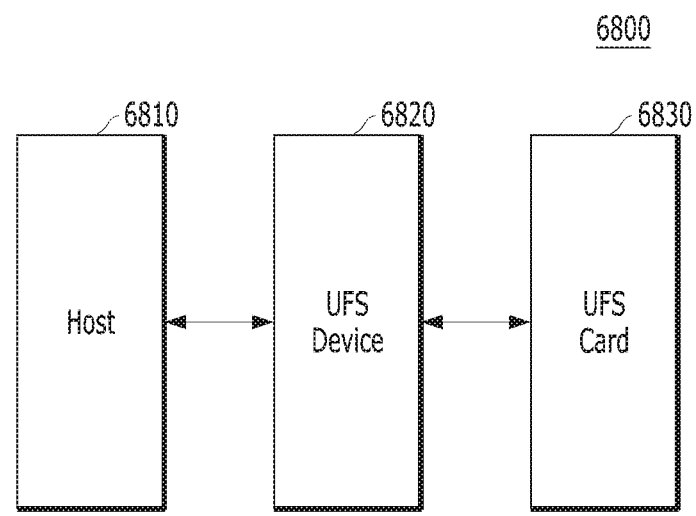

In the UFS system 6800 illustrated in FIG. 15, each of the host 6810, the UFS device 6820 and the UFS card 6830 may include M-PHY and UniPro. The UFS device 6820 may perform a switching operation to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. The host 6810 and the UFS card 6830 may communicate with each other through target ID switching between the M-PHY and UniPro modules of the UFS device 6820. In the illustrated embodiment, one UFS device 6820 is connected to the host 6810 and one UFS card 6830 is connected to the UFS device 6820. However, a plurality of UFS devices may be connected in parallel or in the form of a star to the host 6810, or connected in series or in the form of a chain to the host 6810. A plurality of UFS cards may be connected in parallel or in the form of a star to the UFS device 6820, or connected in series or in the form of a chain to the UFS device 6820.

Figure 16:
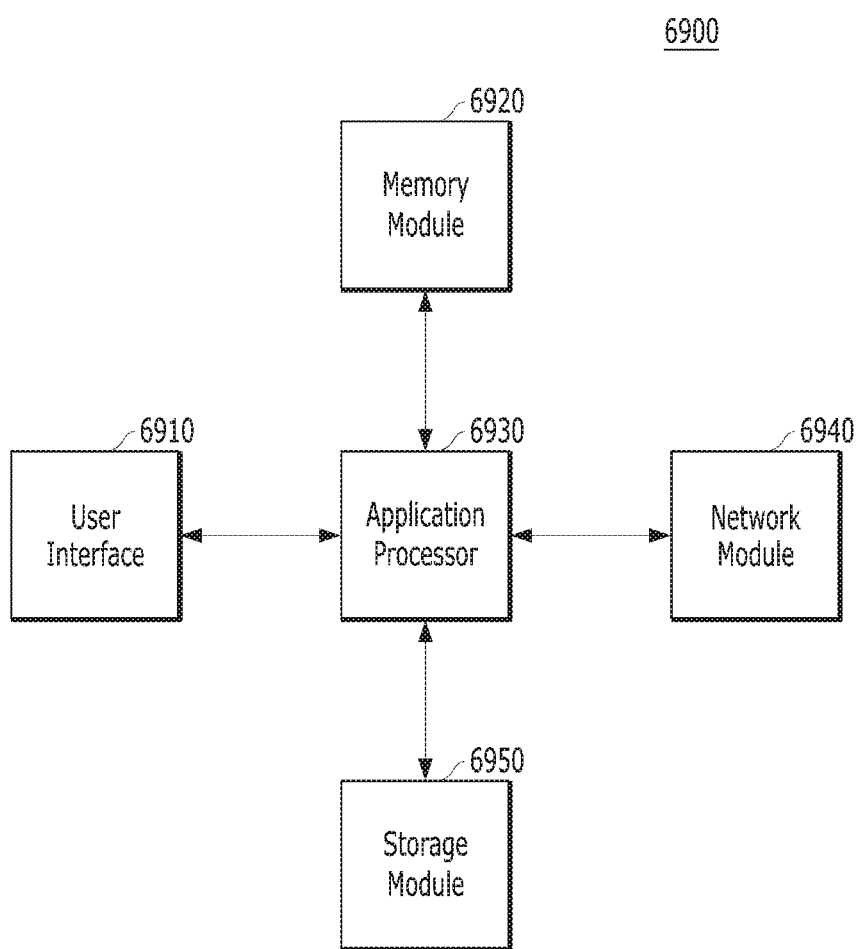

FIG. 16 is a diagram schematically illustrating another example of the data processing system including the memory system in accordance with an embodiment of the present invention. FIG. 16 is a diagram schematically illustrating a user system to which the memory system may be applied.

Referring to FIG. 16, the user system 6900 may include an application processor 6930, a memory module 6920, a network module 6940, a storage module 6950 and a user interface 6910.

More specifically, the application processor 6930 may drive components in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as a DRAM, a SDRAM, a DDR SDRAM, a DDR2 SDRAM, a DDR3 SDRAM, a LPDDR SDARM, a LPDDR3 SDRAM or a LPDDR3 SDRAM or a nonvolatile RAM such as a PRAM, a ReRAM, a MRAM or a FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices, particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, a NOR flash and a 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, an eMMC and an UFS as described above with reference to FIGS. 10 to 15.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

In accordance with embodiments of the present invention, since the read reclaim operation is performed on a victim block based on read counts of memory blocks instead of a host read amount, the frequency of the read reclaim operation may be adjusted considering an actual extent of damage of the memory blocks.

While the present invention has been described with respect to specific embodiments, it will be apparent to those skilled in the art in light of the present disclosure that various changes and modifications may be made without departing from the spirit and scope of the invention as defined in the following claims.

What is claimed is:

1. A memory system, comprising:
 a memory device; and
 a controller configured to select at least one common operation necessary to be performed in first and second tasks, select the first or second task, and selectively perform one or more of a valid data scan operation, a valid data read operation, a valid data write operation, and a valid data map update operation based on selected information,
 wherein the first task includes a garbage collection operation performed on a host data block, a system data block, and a map data block,
 wherein the second task includes a recovery operation performed after a sudden power-off (SPO) that occurs during the valid data map update operation,
 wherein, when the selected task is the first task and a garbage collection target block is any one of the host data block and the system data block, the controller scans valid data stored in a victim block, reads the valid data from the victim block, writes the valid data read from the victim block to a target block, and updates map information of the valid data stored in the map data block, and
 wherein the victim block is a block having an invalid page count equal to or greater than a threshold value.

2. The memory system of claim 1, wherein the controller skips the valid data map update operation when the selected task is the first task and a garbage collection target block is the map data block.

3. The memory system of claim 1, wherein the controller skips the valid data write operation when the selected task is the second task.

4. The memory system of claim 3, wherein the controller generates a NULL signal to skip the valid data write operation.

5. The memory system of claim 1, wherein the target block is a block having a free page count equal to or greater than a threshold value.

6. The memory system of claim 1, wherein, when the selected task is the second task, the controller scans a valid page in which an update operation of map data storing data of a host open block is not completed, reads the valid page, and updates map information of the valid page.

7. The memory system of claim 6, wherein the host open block is a block to which host data is written.

8. The memory system of claim 1, wherein the map data block is a block in which map data storing address information of host data and system data is stored.

9. An operating method of a memory system, comprising:
 checking whether a selected task is a first task or a second task;
 selecting one or more common operations necessary to be performed in the first and second tasks; and
 selectively performing one or more of a valid data scan operation, a valid data read operation, a valid data write operation, and a valid data map update operation based on selected information,
 wherein the first task is a garbage collection operation performed on a host data block, a system data block and a map data block,
 wherein the second task is a recovery operation performed after a sudden power-off (SPO) that occurs during the valid data map update operation,
 wherein, when the selected task is the first task and a garbage collection target block is any one of the host data block and the system data block, valid data stored in a victim block is scanned, the valid data is read from the victim block, the valid data read from the victim block is written to a target block, and map information of the valid data stored in the map data block is updated, and wherein the victim block is a block having a read count equal to or greater than a threshold value.

10. The operating method of claim 9, wherein, when the selected task is the first task and a garbage collection target block is the map data block, the valid data map update operation is skipped.

11. The operating method of claim 9, wherein, when the selected task is the second task, the valid data write operation is skipped.

12. The operating method of claim 11, wherein a NULL signal is generated to skip the valid data write operation.

13. The operating method of claim 9, wherein the target block is a block having a free page count equal to or greater than a threshold value.

14. The operating method of claim 9, wherein, when the selected task is the second task, a valid page in which an update operation of map data storing data of a host open block is not completed is scanned, the valid page is read, and map information of the valid page is updated.

15. The operating method of claim 14, wherein the host open block is a block to which host data is written.

16. The operating method of claim 9, wherein the map data block is a block in which map data storing address information of host data and system data is stored.

* * * * *